United States Patent
Lee

(10) Patent No.: US 8,264,160 B2
(45) Date of Patent: Sep. 11, 2012

(54) ADVANCED ELECTRONIC BALLASTS

(76) Inventor: Sheng-Hann Lee, Saratoga, CA (US)

(*) Notice: Subject to any disclaimer, the term of this patent is extended or adjusted under 35 U.S.C. 154(b) by 346 days.

(21) Appl. No.: 12/698,161

(22) Filed: Feb. 2, 2010

(65) Prior Publication Data

US 2011/0057574 A1    Mar. 10, 2011

Related U.S. Application Data

(60) Provisional application No. 61/239,790, filed on Sep. 4, 2009.

(51) Int. Cl.
*H05B 37/02* (2006.01)

(52) U.S. Cl. .............. 315/209 R; 315/224; 315/287

(58) Field of Classification Search .......... 315/209 R, 315/224–226, 246, 272, 287, 291, 302, 307
See application file for complete search history.

(56) References Cited

U.S. PATENT DOCUMENTS

| | | | | |
|---|---|---|---|---|
| 4,996,462 A | * | 2/1991 | Krummel ............... | 315/209 R |
| 5,068,573 A | * | 11/1991 | Bruning et al. .......... | 315/209 R |
| 5,869,935 A | * | 2/1999 | Sodhi ..................... | 315/225 |
| 5,892,335 A | * | 4/1999 | Archer .................... | 315/247 |
| 7,560,874 B2 | * | 7/2009 | Gahalaut ................. | 315/224 |

* cited by examiner

*Primary Examiner* — Tung X Le
(74) *Attorney, Agent, or Firm* — Winston Hsu; Scott Margo

(57) ABSTRACT

An electronic ballast includes a rectifier circuit, having two output terminals coupled to a first node and a second node; a first capacitor having two ends coupled to the first node and the second node; an inverter, having a first terminal coupled to the first node, a second terminal coupled to the second node and a third terminal; an inductor, having a first end coupled to the third terminal of the inverter and a second end for coupling a first terminal of a lamp; a second capacitor, having two ends for coupling a second terminal and a third terminal of the lamp; a third capacitor, having two ends coupled to the first node and a third node, wherein the third node is further for coupling a fourth terminal of the lamp; and a diode, having two ends coupled to the third node and the second node.

38 Claims, 13 Drawing Sheets

ADVANCED ELECTRONIC BALLASTS

CROSS REFERENCE TO RELATED APPLICATIONS

This application claims the benefit of U.S. provisional application No. 61/239,790, filed on Sep. 4, 2009 and incorporated herein by reference.

BACKGROUND OF THE INVENTION

1. Field of the Invention

The present invention relates to electronic ballasts, and more particularly, to electronic ballasts with the regenerative valley filled power factor correction (RVF PFC) capability. This RVF PFC capability is then further utilized to attain power adjustment capability.

2. Description of the Prior Art

The power factor (PF) is a measure of the power quality as defined by: PF=real power/apparent power=displacement factor*distortion factor=$\cos \phi / \sqrt{(1+THD^2)}$, where $\phi$ is the phase shift between the mains voltage and mains current, and the THD is the total harmonic distortion of the mains current, respectively. From a system standpoint, loss due to the phase shift in a device can be recaptured more economically at a group level to get the averaging benefit, but loss due to the THD prefers to be corrected at the device with a power factor correction (PFC) scheme. Otherwise a very bulky and expensive filter operating at the mains frequency is required along with a risk of power system hazard.

Unfortunately, most of the modern electronic devices operate with a dc source that is rectified and filtered from the mains. The filtering capacitor is commonly referred to as the bus capacitor. It receives charges from the rectified mains at an instant causing severe THD on the mains current.

Electronic ballast inside a compact fluorescent lamp (CFL) also uses solid-state electronic circuitry to provide the proper starting and operating electrical conditions to power one or more fluorescent lamps and more recently HID (High Intensive Discharge) lamps. Because of the higher efficiency of the ballast over the traditional magnetic ballast and the improvement of lamp efficiency by operating at a higher signal frequency, electronic ballast offers higher system efficiency. As a result, the CFL has gained tremendous popularity under the banner of energy savings, while its cost and size structure disallows its integral electronic ballast to be equipped with a PFC in most applications.

SUMMARY OF THE INVENTION

It is therefore one of the objectives of the present invention to provide electronic ballasts with the regenerative valley filled power factor correction (RVF PFC) capability, which are easy to be implemented and only occupy a small circuit space, to solve the above mentioned problem.

According to an embodiment of the present invention, an exemplary electronic ballast is disclosed. The exemplary electronic ballast includes a rectifier circuit, a first capacitor, an inverter, an inductor, a second capacitor, a third capacitor and a diode. The rectifier circuit has a pair of input terminals for receiving an ac (alternating current) input voltage and a pair of output terminals for outputting a dc (direct current) voltage, wherein a first output terminal of the rectifier circuit is coupled to a first node and a second output terminal of the rectifier circuit is coupled to a second node; The first capacitor has two ends coupled to the first node and the second node, respectively; The inverter has a first terminal, a second terminal and a third terminal, wherein the first terminal of the inverter is coupled to the first node, the second terminal of the inverter is coupled to the second node; The inductor has a first end coupled to the third terminal of the inverter and a second end for coupling a first terminal of a lamp; The second capacitor has two ends for coupling a second terminal and a third terminal of the lamp, respectively; The third capacitor has two ends coupled to the first node and a third node, respectively, wherein the third node is further for coupling a fourth terminal of the lamp; and the diode has two ends coupled to the third node and the second node, respectively.

According to another embodiment of the present invention, an exemplary electronic ballast is disclosed. The exemplary electronic ballast includes a rectifier circuit, a first capacitor, an inverter, an inductor, a second capacitor, a third capacitor, a first diode, a fourth capacitor and a second diode. The rectifier circuit has a pair of input terminals for receiving an ac input voltage and a pair of output terminals for outputting a dc voltage, wherein a first output terminal of the rectifier circuit is coupled to a first node and a second output terminal of the rectifier circuit is coupled to a second node; The first capacitor has two ends coupled to the first node and the second node, respectively; The inverter has a first terminal, a second terminal and a third terminal, wherein the first terminal of the inverter is coupled to the first node, the second terminal of the inverter is coupled to the second node; The inductor has a first end coupled to the third terminal of the inverter and a second end for coupling a first terminal of a lamp; The second capacitor has two ends for coupling a second terminal and a third terminal of the lamp, respectively; The third capacitor has two ends coupled to the first node and a third node, respectively; The first diode has two ends coupled to the third node and the second node, respectively; The fourth capacitor has a first end coupled to the first node and a second end for coupling the fourth terminal of the lamp; and the second diode has two ends coupled to the second end of the fourth capacitor and the third node, respectively.

According to yet another embodiment of the present invention, an exemplary electronic ballast is disclosed. The exemplary electronic ballast includes a rectifier circuit, a first capacitor, an inverter, an inductor, a second capacitor, a third capacitor, a fourth capacitor, a fifth capacitor, a first diode, a second diode and a third diode. The rectifier circuit has a pair of input terminals for receiving an ac input voltage and a pair of output terminals for outputting a dc voltage, wherein a first output terminal of the rectifier circuit is coupled to a first node and a second output terminal of the rectifier circuit is coupled to a second node; The first capacitor has two ends coupled to the first node and the second node, respectively; The inverter has a first terminal, a second terminal and a third terminal, wherein the first terminal of the inverter is coupled to the first node, the second terminal of the inverter is coupled to the second node; The inductor has a first end coupled to the third terminal of the inverter and a second end for coupling a first terminal of a lamp; The second capacitor has two ends for coupling a second terminal and a third terminal of the lamp, respectively; The third capacitor has two ends coupled to the first node and a third node, respectively, wherein the third node is further for coupling a fourth terminal of the lamp; The fourth capacitor has two ends coupled to a fourth node and the second end of the inductor; The fifth capacitor has two ends coupled to the first node and a fifth node; The first diode has two ends coupled to the first node and the fourth node, respectively; The second diode has two ends coupled to the fourth node and the fifth node, respectively; and the third diode has two ends coupled to the fifth node and the second node, respectively.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular components. As one skilled in the art will appreciate, hardware manufacturers may refer to a component by different names. This document does not intend to distinguish between components that differ in name but in function. In the following discussion and in the claims, the terms "include", "including", "comprise", and "comprising" are used in an open-ended fashion, and thus should be interpreted to mean "including, but not limited to . . . ". The terms "couple" and "coupled" are intended to mean either an indirect or a direct electrical connection. Thus, if a first device couples to a second device, that connection may be through a direct electrical connection, or through an indirect electrical connection via other devices and connections.

Hereinafter, preferred embodiments of the present invention will be described in detail with reference to the accompanying drawings. Here, it is to be noted that the present invention is not limited thereto. Any alternative design without departing from the spirit of the present invention falls within the scope of the present invention.

Figure 1:
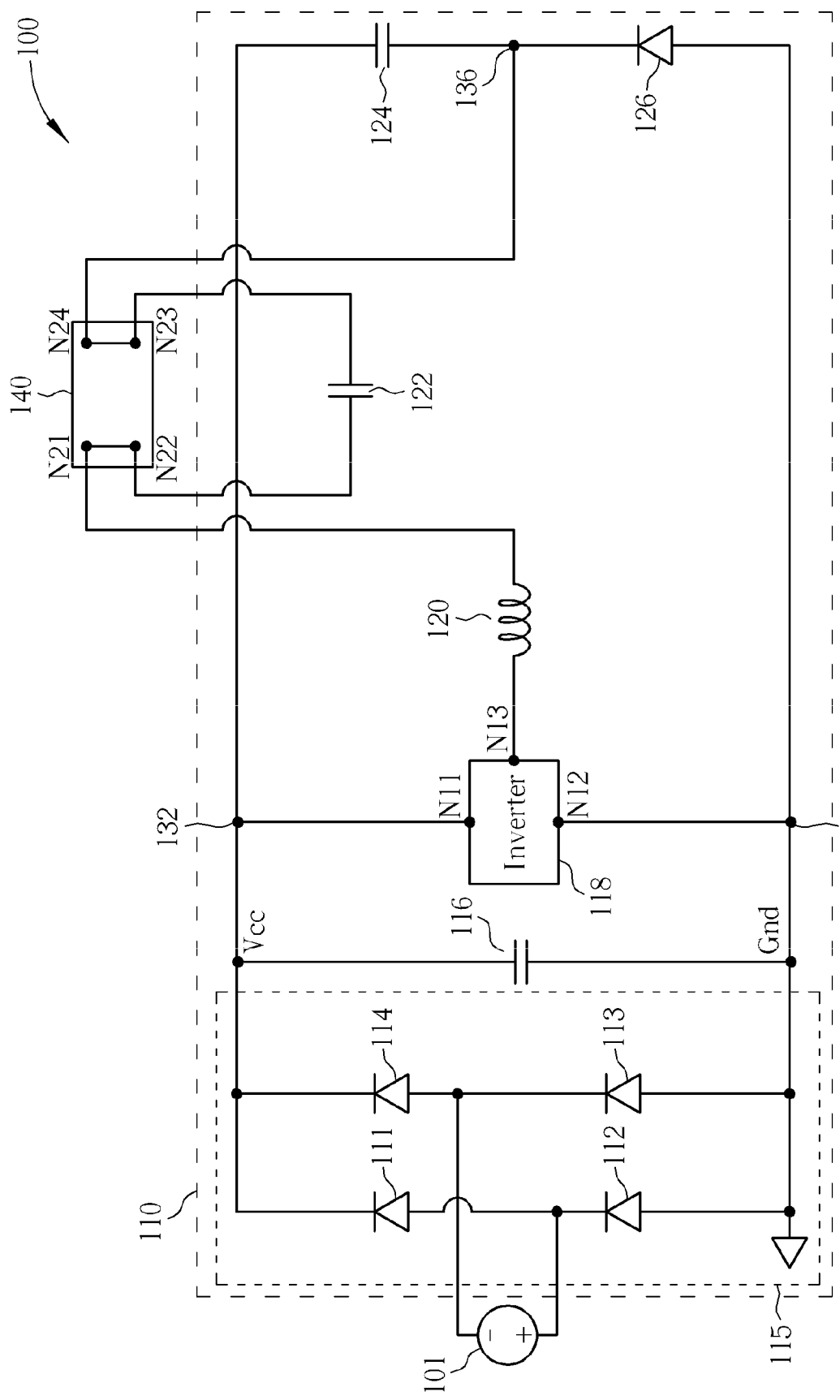
FIG. 1 is a circuit diagram schematically showing an electronic ballast in accordance with a first embodiment of the present invention.

Please refer to FIG. 1, which is a circuit diagram schematically showing an electronic ballast in accordance with a first embodiment of the present invention. As shown in FIG. 1, the lighting system 100 comprises an ac (alternating current) input source 101, an electronic ballast 110 and a lamp 140. The ac input source 101 is employed to generate an ac input voltage. In this embodiment, the lamp 140 is a compact fluorescent lamp (CFL), but this should not be construed as a limitation of the present invention. The electronic ballast 110 is coupled with the ac input source 101 and the lamp 140 for powering the lamp 140.

The electronic ballast 110 includes, but is not limited to, a rectifier circuit 115, a first capacitor 116, an inverter 118, a first inductor 120, a second capacitor 122, a third capacitor 124 and a diode 126. The rectifier circuit 115 functions to convert the ac input voltage into a dc (direct current) voltage (i.e., a mains voltage). A pair of input terminals of the rectifier circuit 115 is adapted to receive the ac input voltage. A pair of output terminals of the rectifier circuit 115 is utilized for outputting the dc voltage, where the first output terminal of the rectifier circuit 115 is coupled to a first node 132 and the second output terminal of the rectifier circuit 115 is coupled to a second node 134, where the second node 134 in the exemplary embodiment shown in FIG. 1 is a ground node. The rectifier circuit 115 can be a full-wave bridge rectifier circuit including four diodes 111~114 as shown in FIG. 1. It should be noted that the lighting system 100 may further include an electromagnetic interference (EMI) filter (not shown) coupled with the input terminals or the output terminals of the rectifier circuit 115.

The first capacitor 116, having two ends coupled to the first node 132 and the second node 134, respectively. The first capacitor 116 is a signal-terminating capacitor properly sized to present low impedance at a signal frequency and high impedance at a mains frequency, to allow the Vcc to track the mains voltage before the valley voltage takes over. The inverter 118 has a first terminal N11, a second terminal N12 and a third terminal N13, where the first terminal N11 of the inverter 118 is coupled to the first node 132, the second terminal N12 of the inverter 118 is coupled to the second node 134. The inverter 118 inverts the Vcc to output high-frequency ac signals at the third terminal N13 that is used with the first inductor 120 and the second capacitor 122, for providing a sinusoidal driving signal with high ac voltage to light the lamp 140. The first inductor 120 has a first end coupled to the third terminal N13 of the inverter 118 and a second end coupled to a first terminal N21 of the lamp 140. The second capacitor 122 has two ends coupled a second terminal N22 and a third terminal N23 of the lamp 140, respectively. The first inductor 120 and the second capacitor 122 form a high-Q resonant network that strikes the lamp 140. The third capacitor 124 has two ends coupled to the first node 132 and a third node 136, respectively, where the third node 136 is also coupled to a fourth terminal N24 of the lamp 140. In addition, the third capacitor 124 functions as a bus capacitor and signal-terminating capacitor alternately. The diode 126 has a cathode coupled to the third node 136 and an anode coupled to the second node 134.

Figure 2:
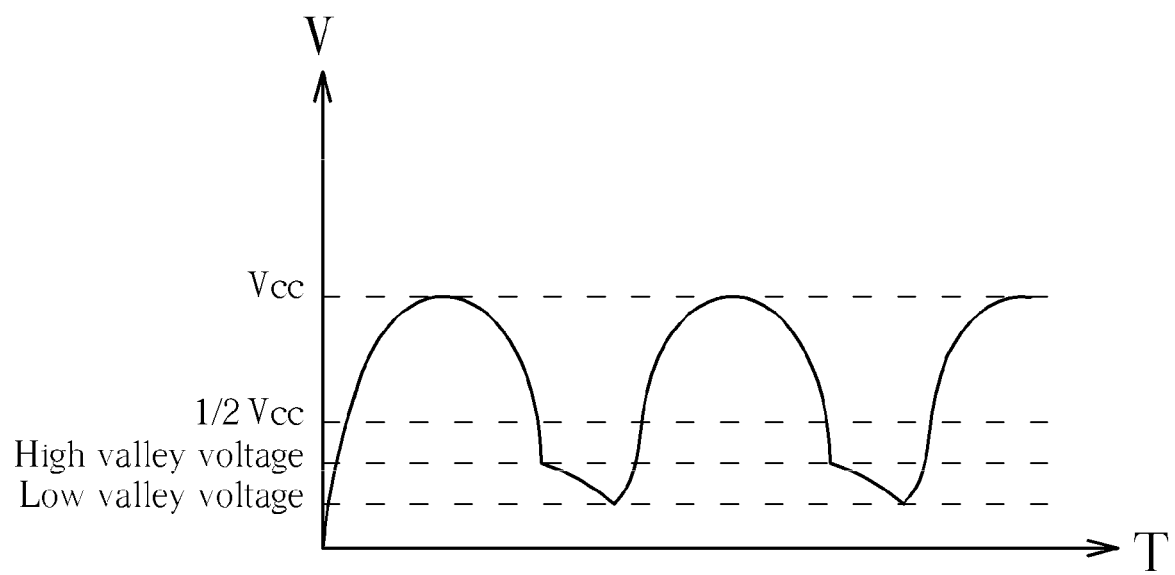
FIG. 2 is a schematic diagram showing the related signal waveforms regarding operations of the electronic ballast in FIG. 1.

Please refer to FIG. 2. FIG. 2 is a schematic diagram showing the related signal waveforms regarding operations of the electronic ballast 110 in FIG. 1. As shown in FIG. 2, the signal waveform is the voltage variation at the first node 132. When the voltage Vcc of the first node 132 (i.e., the mains voltage) is higher than the voltage across the third capacitor 124, the third capacitor 124 will be charged by the inverter 118 through the inductor 120 and the lamp 140 at the signal frequency, and when the voltage Vcc falls below the voltage across the third capacitor 124, the third capacitor 124 will be discharged to power the lighting system 100 with a valley voltage through the forward-biased diode 126 at twice the mains frequency. In the steady state, the voltage across the third capacitor 124 is a function of the average voltage outputted by the rectifier circuit 115, duty cycle of the inverter 118 and the IR loss of the lamp 140, where I represents the average current flowing though the lamp 140 and R is the average impedance of the lamp 140, with additional drooping during the valley voltage period. The third capacitor 124 is used for terminating the lamp 140 to the voltage Vcc, thereby achieving dc isolation for the lamp 140 before the diode 126 conducts. And the third capacitor 124 is also used as a low-pass filter when the third capacitor 124 is being charged.

Since the bus capacitor, i.e., the third capacitor 124, is charged at the signal frequency and powers the system only when the valley voltage is on, good power factor is attained. In addition, due to high lamp impedance under low valley voltage working conditions, the lamp 140 can operate without a dc isolation capacitor when the diode 126 conducts to simplify the hardware.

Figure 3:
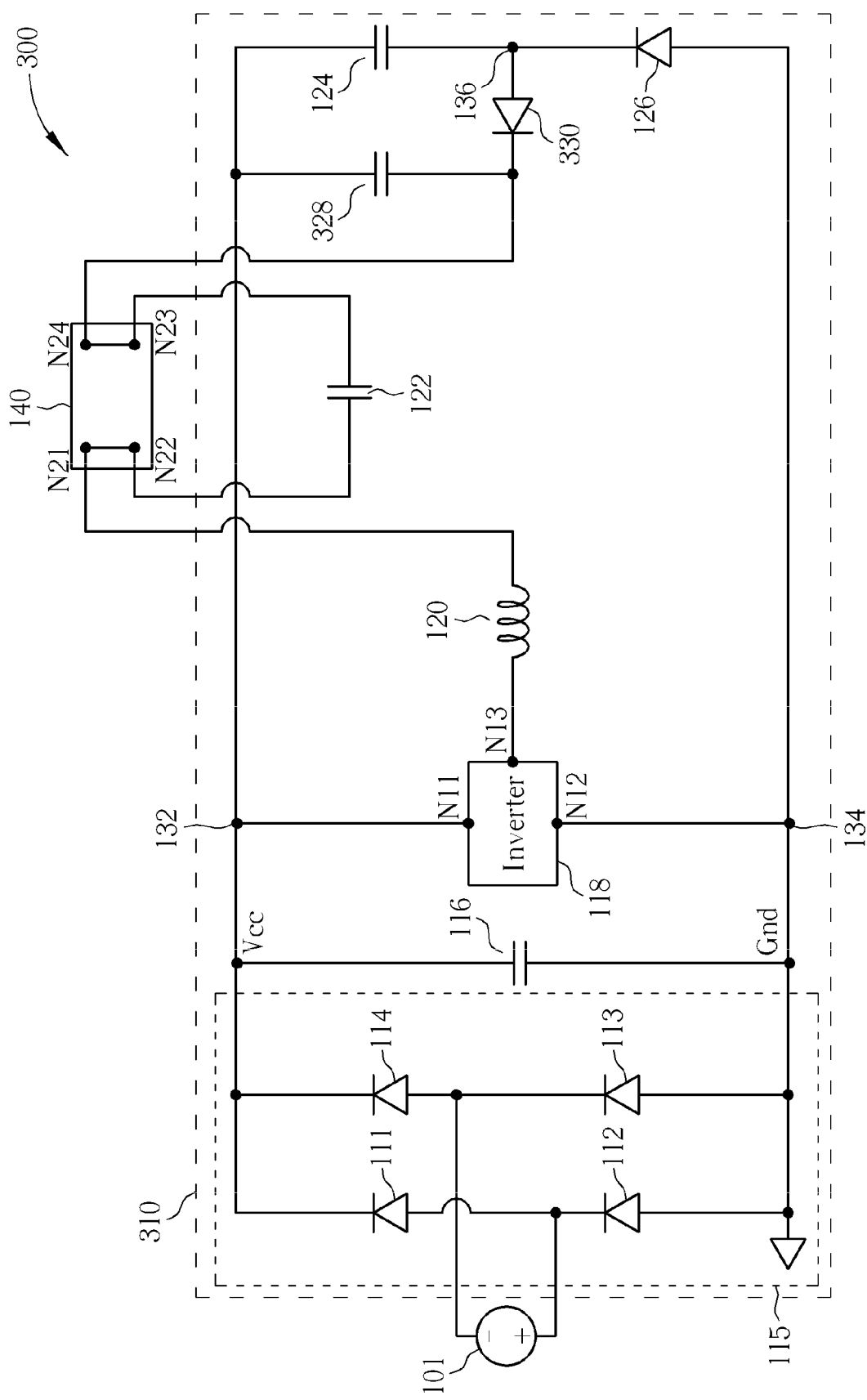
FIG. 3 is a circuit diagram schematically showing an electronic ballast in accordance with a second embodiment of the present invention.

Please refer to FIG. 3, which is a circuit diagram schematically showing an electronic ballast in accordance with a second embodiment of the present invention. As shown in FIG. 3, the lighting system 300 includes, but is not limited to, the ac input source 101, the lamp 140 and an electronic ballast 310. The electronic ballast 310 is similar to the electronic ballast 110 shown in FIG. 1, and the major difference there between is a fourth capacitor 328 and a second diode 330 included in the electronic ballast 310 in FIG. 3. The fourth capacitor 328 has a first end coupled to the first node 132 and a second end coupled to the fourth terminal N24 of the lamp 140. The fourth capacitor 328 is used for terminating the lamp 140 to the voltage Vcc to achieve dc isolation for the lamp 140. The second diode 330 has a cathode coupled to the second end of the fourth capacitor 328 and an anode coupled to the third node 136. The second diode 330 only allows one-way current to charge the third capacitor 124 and the opposite current will be blocked by the second diode 330, therefore, the valley voltage of the third capacitor 124 can be increased.

Please note that, in the second embodiment of the present invention, the fourth capacitor 328 is used for terminating the lamp 140 to the voltage Vcc to achieve dc isolation for the lamp 140, however, this embodiment merely serves as an example for illustrating the present invention, and should not be taken as a limitation to the scope of the present invention, the first end of the fourth capacitor 328 can be coupled to the second node 134, for terminating the lamp 140 to the ground voltage Gnd to achieve dc isolation for the lamp 140.

Figure 4:
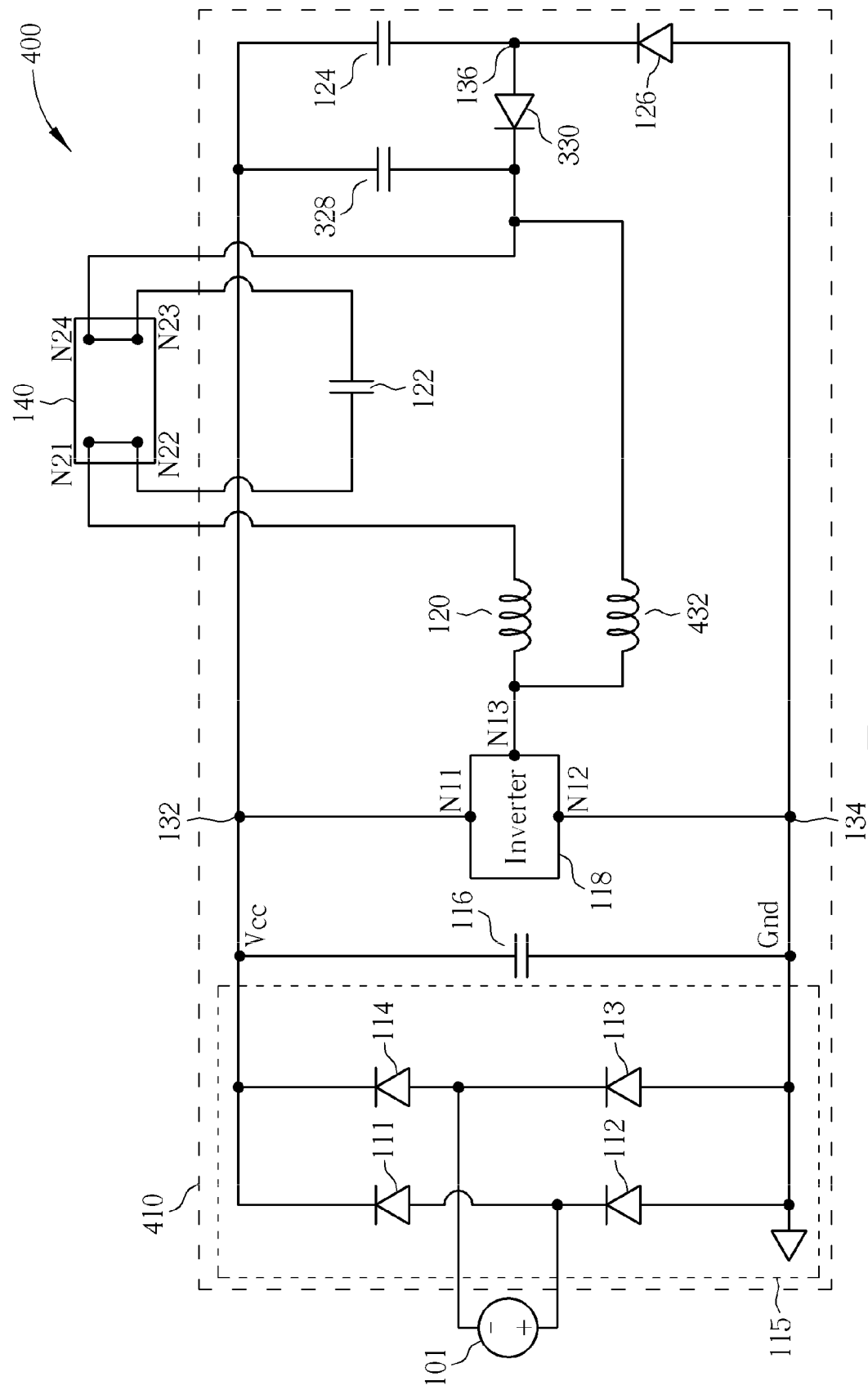
FIG. 4 is a circuit diagram schematically showing an electronic ballast in accordance with a third embodiment of the present invention.

Please refer to FIG. 4, which is a circuit diagram schematically showing an electronic ballast in accordance with a third embodiment of the present invention. As shown in FIG. 4, the lighting system 400 includes, but is not limited to, the ac input source 101, the lamp 140 and an electronic ballast 410. The electronic ballast 410 is similar to the electronic ballast 310 shown in FIG. 3, and the major difference there between is a second inductor 432 included in the electronic ballast 410 in FIG. 4. The second inductor 432 has two ends coupled to the second end of the fourth capacitor 328 and the third terminal N13 of the inverter 118, respectively. The second inductor 432 is added to eliminate the dc voltage drop of the valley voltage due to the IR loss of the lamp 140. Because the dc current charging the third capacitor 124 will flow though the second inductor 432 instead of flowing through the first inductor 120 and the lamp 140, the IR loss of the lighting system 400 can be decreased greatly.

Please note that, in the third embodiment of the present invention, the fourth capacitor 328 is used for terminating the lamp 140 to the voltage Vcc to achieve dc isolation for the lamp 140, however, this embodiment merely serves as an example for illustrating the present invention, and should not be taken as a limitation to the scope of the present invention, the first end of the fourth capacitor 328 can be coupled to the second node 134, for terminating the lamp 140 to the ground voltage Gnd to achieve dc isolation for the lamp 140.

Figure 5:
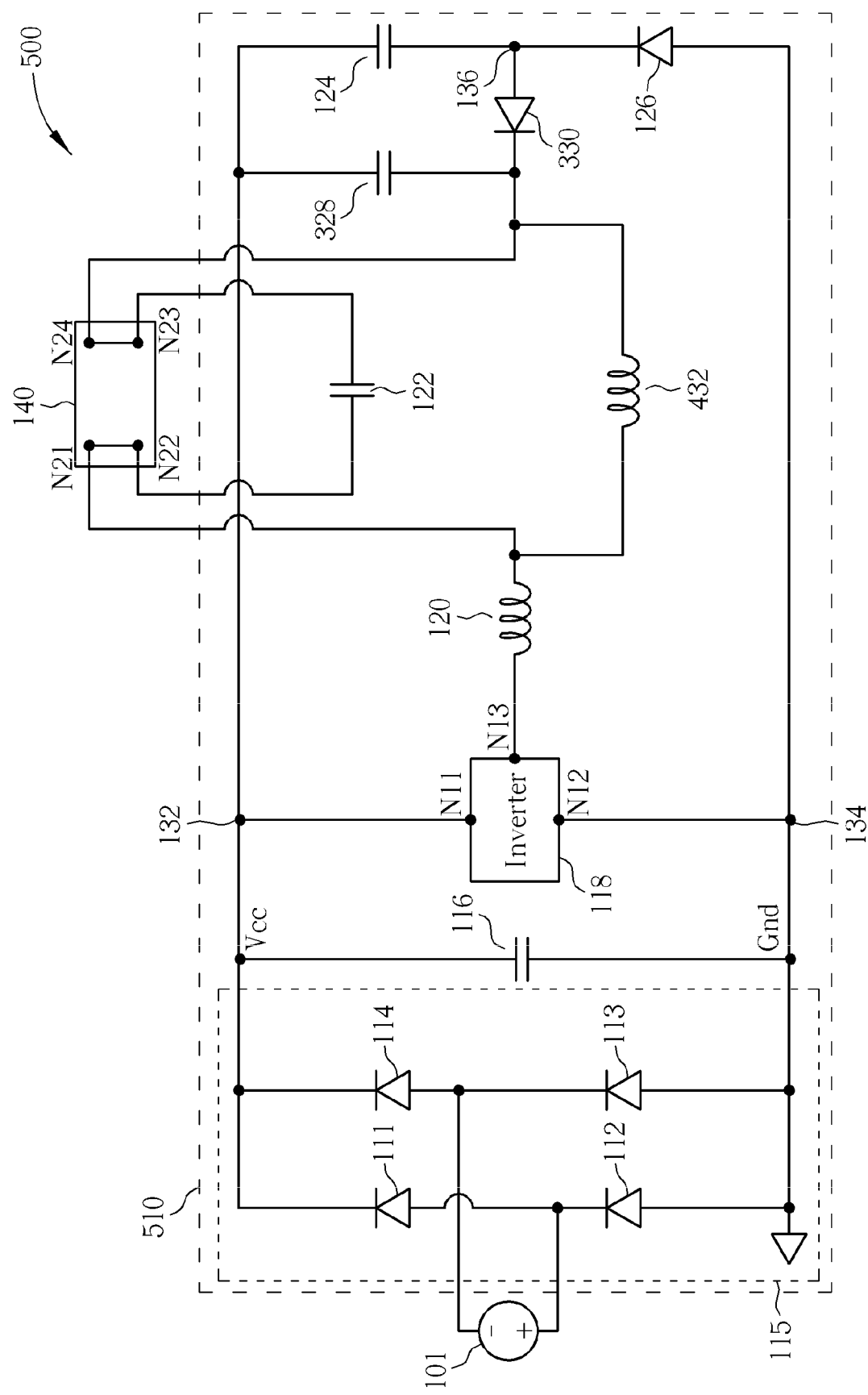
FIG. 5 is a circuit diagram schematically showing an electronic ballast in accordance with a fourth embodiment of the present invention.

Please refer to FIG. 5, which is a circuit diagram schematically showing an electronic ballast in accordance with a fourth embodiment of the present invention. As shown in FIG. 5, the lighting system 500 includes, but is not limited to, the ac input source 101, the lamp 140 and an electronic ballast 510. The electronic ballast 510 is similar to the electronic ballast 410 shown in FIG. 4, and the major difference there between is that the second inductor 432 coupled between the second end of the fourth capacitor 328 and the second end of the first inductor 120. As those skilled in this art can easily understand the operations of the electronic ballast 510 after reading the disclosure of the third embodiment, further details are omitted here for brevity.

Please note that, in the fourth embodiment of the present invention, the fourth capacitor 328 is used for terminating the lamp 140 to the voltage Vcc to achieve dc isolation for the lamp 140, however, this embodiment merely serves as an example for illustrating the present invention, and should not be taken as a limitation to the scope of the present invention, the first end of the fourth capacitor 328 can be coupled to the second node 134, for terminating the lamp 140 to the ground voltage Gnd to achieve dc isolation for the lamp 140.

Figure 6:
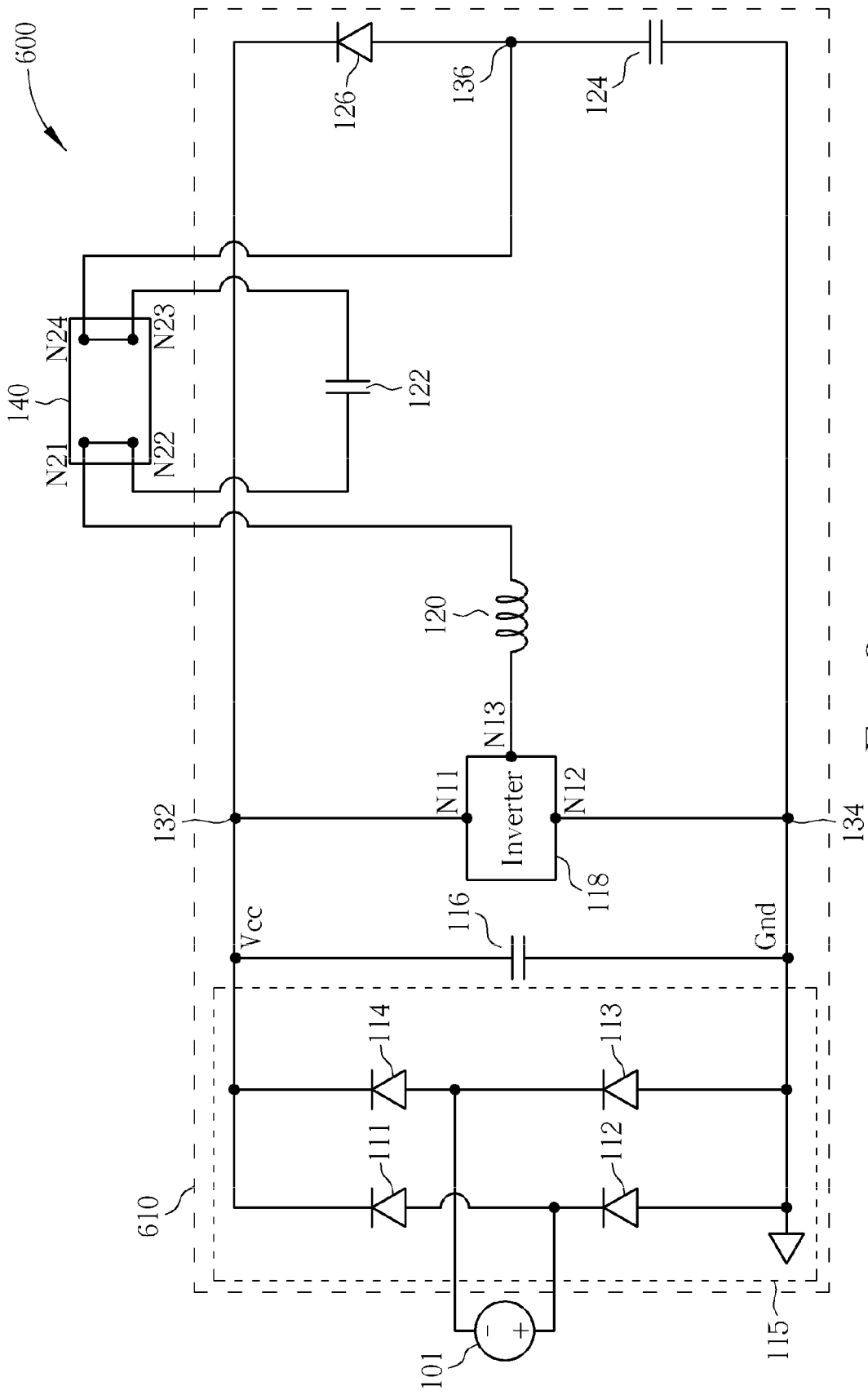
FIG. 6 is a circuit diagram schematically showing an electronic ballast in accordance with a fifth embodiment of the present invention.

Please refer to FIG. 6, which is a circuit diagram schematically showing an electronic ballast in accordance with a fifth embodiment of the present invention. As shown in FIG. 6, the lighting system 600 includes, but is not limited to, the ac input source 101, the lamp 140 and an electronic ballast 610. The electronic ballast 610 is similar to the electronic ballast 110 shown in FIG. 1, and the major difference there between is that the anode of the first diode 126 is coupled to the third node 136, the cathode of the first diode 126 is coupled to the first node 132, and the third capacitor 124 has two ends coupled to the second node 134 (the ground node) and the third node 136, respectively. As those skilled in this art can easily understand the operations of the electronic ballast 610 after reading the disclosure of the first embodiment, further details are omitted here for brevity.

Figure 7:
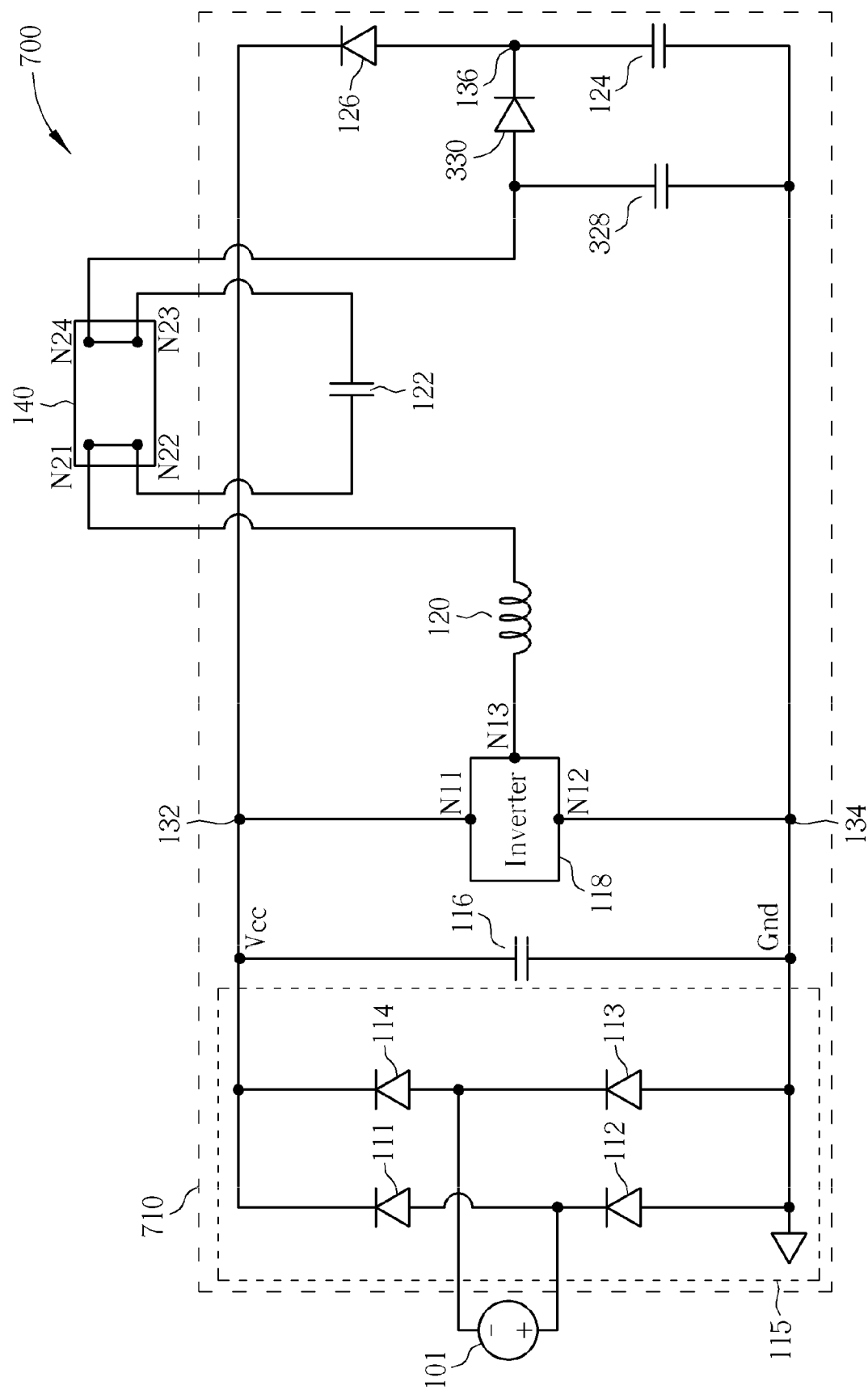
FIG. 7 is a circuit diagram schematically showing an electronic ballast in accordance with a sixth embodiment of the present invention.

Please refer to FIG. 7, which is a circuit diagram schematically showing an electronic ballast in accordance with a sixth embodiment of the present invention. As shown in FIG. 7, the lighting system 700 includes, but is not limited to, the ac input source 101, the lamp 140 and an electronic ballast 710. The electronic ballast 710 is similar to the electronic ballast 310 shown in FIG. 3, and the major difference there between is that the anode of the first diode 126 is coupled to the third node 136, the cathode of the first diode 126 is coupled to the first node 132, the anode of the second diode 330 is coupled to the second end of the fourth capacitor 328, the cathode of the second diode 330 is coupled to the third node 136, the third capacitor 124 has two ends coupled to the second node 134 (the ground node) and the third node 136, respectively, and the fourth capacitor 328 has a first end coupled to the second node 134 and a second end coupled to the fourth terminal N24 of the lamp 140. As those skilled in this art can easily understand the operations of the electronic ballast 710 after reading the disclosure of the second embodiment, further details are omitted here for brevity.

Please note that, in the sixth embodiment of the present invention, the fourth capacitor 328 is used for terminating the lamp 140 to the ground voltage Gnd to achieve dc isolation for the lamp 140, however, this embodiment merely serves as an example for illustrating the present invention, and should not be taken as a limitation to the scope of the present invention, the first end of the fourth capacitor 328 can be coupled to the first node 132, for terminating the lamp 140 to the voltage Vcc to achieve dc isolation for the lamp 140.

Figure 8:
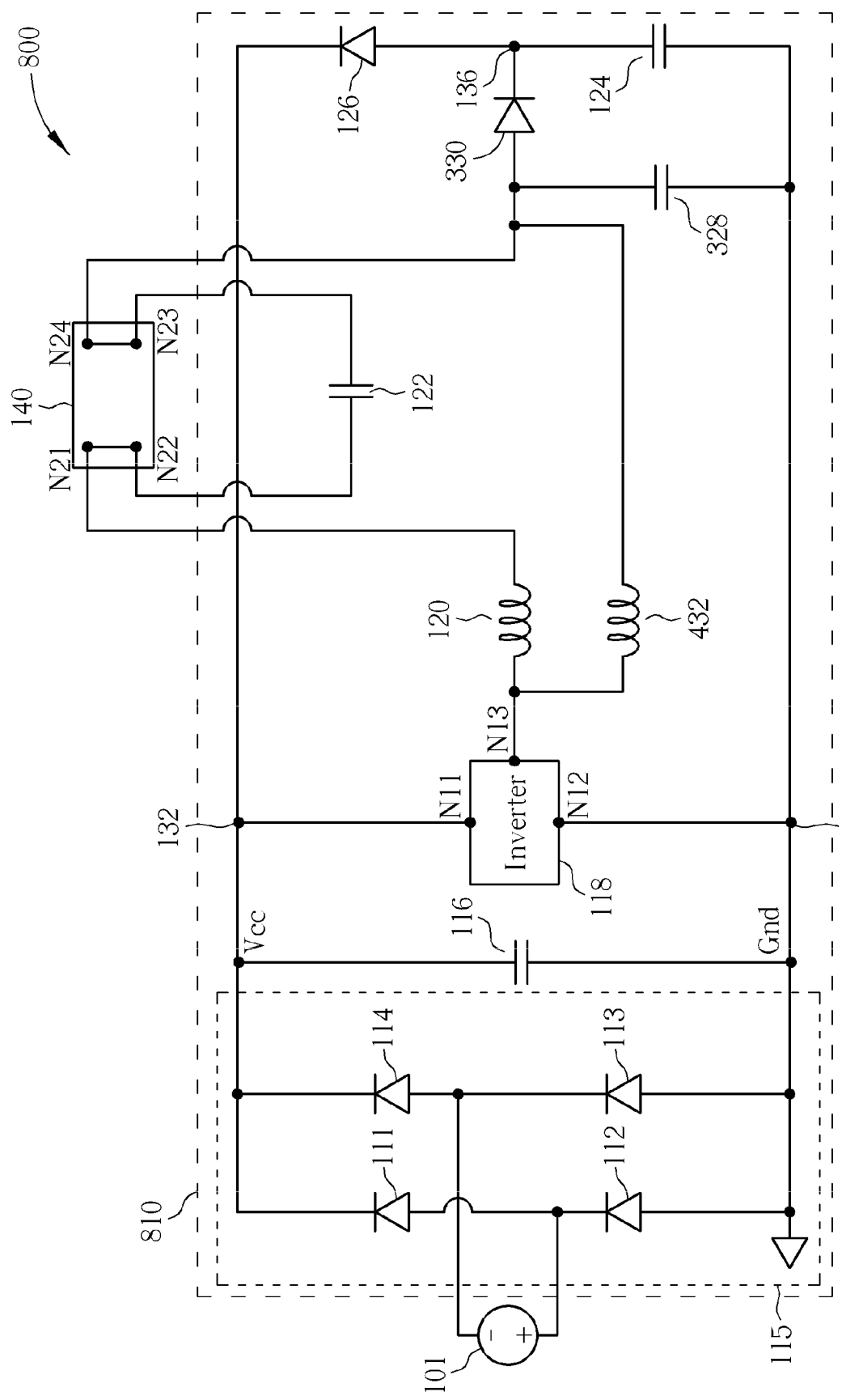
FIG. 8 is a circuit diagram schematically showing an electronic ballast in accordance with a seventh embodiment of the present invention.

Please refer to FIG. 8, which is a circuit diagram schematically showing an electronic ballast in accordance with a seventh embodiment of the present invention. As shown in FIG. 8, the lighting system 800 includes, but is not limited to, the ac input source 101, the lamp 140 and an electronic ballast 810. The electronic ballast 810 is similar to the electronic ballast 410 shown in FIG. 4, and the major difference there between is that the anode of the first diode 126 is coupled to the third node 136, the cathode of the first diode 126 is coupled to the first node 132, the anode of the second diode 330 is coupled to the second end of the fourth capacitor 328, the cathode of the second diode 330 is coupled to the third node 136, the third capacitor 124 has two ends coupled to the second node 134 (the ground node) and the third node 136, respectively, and the fourth capacitor 328 has a first end coupled to the second node 134 and a second end coupled to the fourth terminal N24 of the lamp 140. As those skilled in this art can easily understand the operations of the electronic ballast 810 after reading the disclosure of the third embodiment, further details are omitted here for brevity.

Please note that, in the seventh embodiment of the present invention, the fourth capacitor 328 is used for terminating the lamp 140 to the ground voltage Gnd to achieve dc isolation for the lamp 140, however, this embodiment merely serves as an example for illustrating the present invention, and should not be taken as a limitation to the scope of the present invention, the first end of the fourth capacitor 328 can be coupled to the first node 132, for terminating the lamp 140 to the voltage Vcc to achieve dc isolation for the lamp 140.

Figure 9:
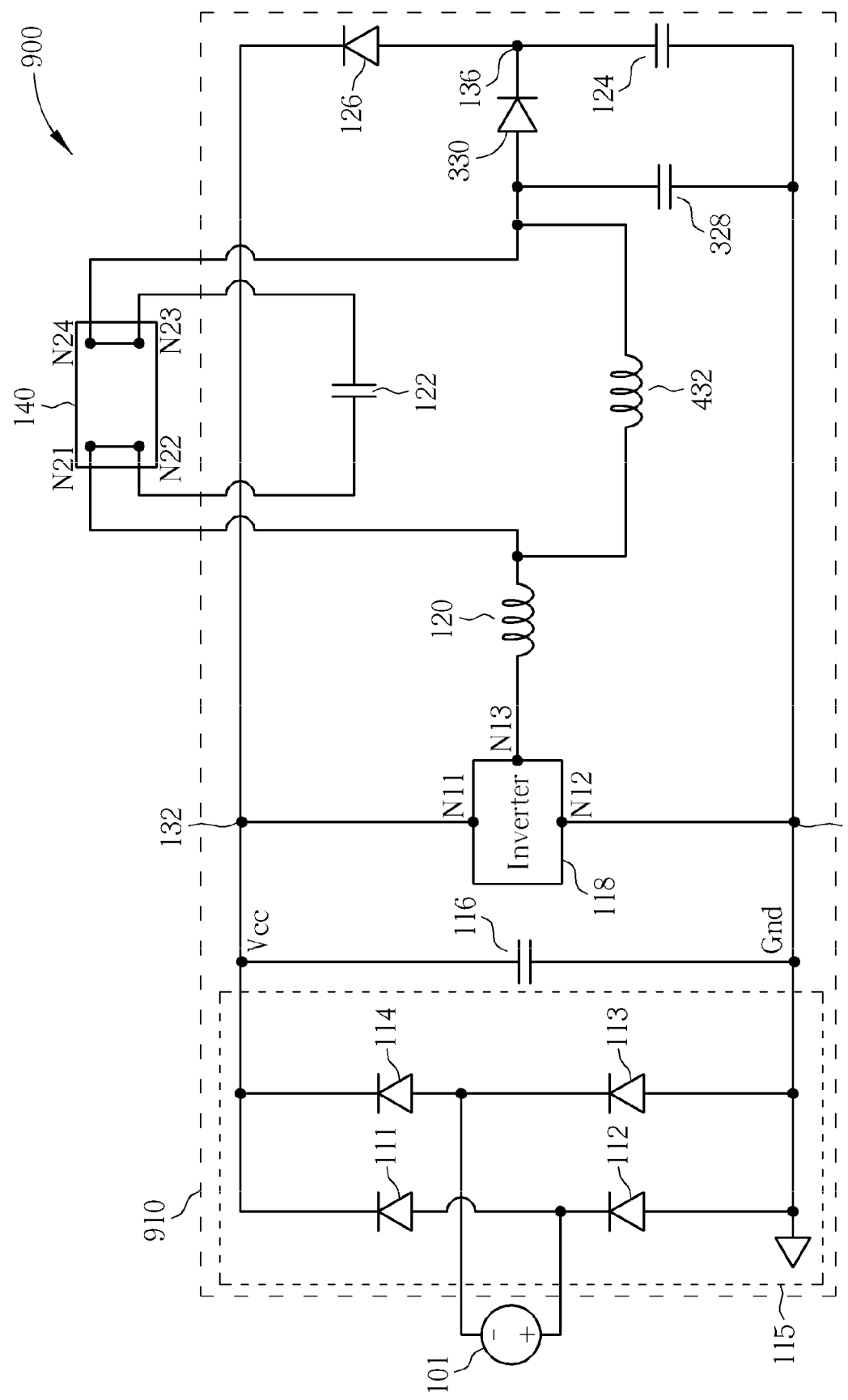
FIG. 9 is a circuit diagram schematically showing an electronic ballast in accordance with an eighth embodiment of the present invention.

Please refer to FIG. 9, which is a circuit diagram schematically showing an electronic ballast in accordance with a eighth embodiment of the present invention. As shown in FIG. 9, the lighting system 900 includes, but is not limited to, the ac input source 101, the lamp 140 and an electronic ballast 910. The electronic ballast 910 is similar to the electronic ballast 510 shown in FIG. 5, and the major difference there between is that the anode of the first diode 126 is coupled to the third node 136, the cathode of the first diode 126 is coupled to the first node 132, the anode of the second diode 330 is coupled to the second end of the fourth capacitor 328, the cathode of the second diode 330 is coupled to the third node 136, the third capacitor 124 has two ends coupled to the second node 134 (the ground node) and the third node 136, respectively, and the fourth capacitor 328 has a first end coupled to the second node 134 and a second end coupled to the fourth terminal N24 of the lamp 140. As those skilled in this art can easily understand the operations of the electronic ballast 910 after reading the disclosure of the fourth embodiment, further details are omitted here for brevity.

Please note that, in the eighth embodiment of the present invention, the fourth capacitor 328 is used for terminating the lamp 140 to the ground voltage Gnd to achieve dc isolation for the lamp 140, however, this embodiment merely serves as an example for illustrating the present invention, and should not be taken as a limitation to the scope of the present invention, the first end of the fourth capacitor 328 can be coupled to the first node 132, for terminating the lamp 140 to the voltage Vcc to achieve dc isolation for the lamp 140.

Figure 10:
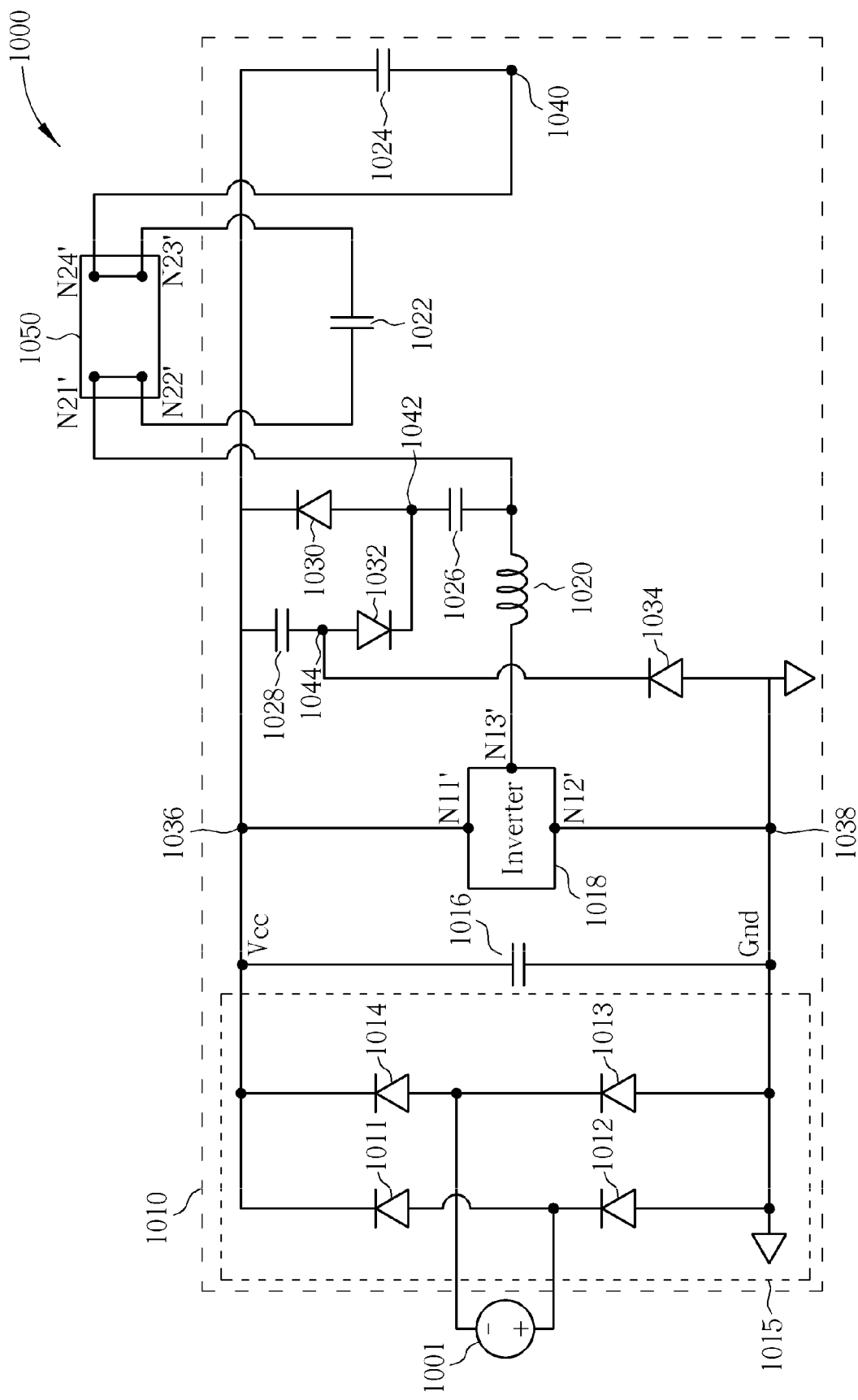
FIG. 10 is a circuit diagram schematically showing an electronic ballast in accordance with a ninth embodiment of the present invention.

Please refer to FIG. 10, which is a circuit diagram schematically showing an electronic ballast in accordance with a ninth embodiment of the present invention. As shown in FIG. 10, the lighting system 1000 includes, but is not limited to, the ac input source 1001, the lamp 1050 and an electronic ballast 1010. In this exemplary embodiment, the electronic ballast 1010 includes, but is not limited to, a rectifier circuit 1015, a first capacitor 1016, an inverter 1018, an inductor 1020, a second capacitor 1022, a third capacitor 1024, a fourth capacitor 1026, a fifth capacitor 1028, a first diode 1030, a second diode 1032 and a third diode 1034. The rectifier circuit 1015 functions to convert the ac input voltage into a dc voltage. A pair of input terminals of the rectifier circuit 1015 is adapted to receive the ac input voltage. A pair of output terminals of the rectifier circuit 1015 is utilized for outputting the dc voltage, where the first output terminal of the rectifier circuit 1015 is coupled to a first node 1036 and the second output terminal of the rectifier circuit 1015 is coupled to a second node 1038. In this exemplary embodiment, the second node 1038 is a ground node. The rectifier circuit 1015 can be a full-wave bridge rectifier circuit including four diodes 1011-1014 as shown in FIG. 10. The first capacitor 1016, having two ends coupled to the first node 1036 and the second node 1038, is employed to function as a signal-terminating capacitor. The inverter 1018 has a first terminal N11', a second terminal N12' and a third terminal N13', where the first terminal N11' of the inverter 1018 is coupled to the first node 1036, and the second terminal N12' of the inverter 1018 is coupled to the second node 1038. The inverter 1018 inverts the Vcc to output high-frequency ac signals at the third terminal N13' that is used with the first inductor 1020 for providing a sinusoidal driving signal with high ac voltage to light the lamp 1050. The inductor 1020 has a first end coupled to the third terminal N13' of the inverter 1018 and a second end coupled to a first terminal N21' of the lamp 1050. The second capacitor 1022 has two ends coupled a second terminal N22' and a third terminal N23' of the lamp 1050, respectively. The inductor 1020 and the second capacitor 1022 form a high-Q resonant network that strikes the lamp 1050. The third capacitor 1024 has two ends coupled to the first node 1036 and a third node 1040, respectively, where the third node 1040 is also coupled to a fourth terminal N24' of the lamp 1050. The fourth capacitor 1026 has two ends coupled to a fourth node 1042 and the second end of the inductor 1020. The fifth capacitor 1028 has two ends coupled to the first node 1036 and a fifth node 1044, and it functions as a bus capacitor. The first diode 1030 has a cathode coupled to the first node 1036 and an anode coupled to the fourth node 1042. The second diode 1032 has a cathode coupled to the fourth node 1042 and an anode coupled to the fifth node 1044. The third diode 1034 has a cathode coupled to the fifth node 1044 and an anode coupled to the second node 1038.

The inductor 1020 and the capacitor 1026 function as an ac current source. Positive currents out of the inverter 1018 will go through the diode 1030 to terminate at the node 1036, while negative currents go through the diode 1032 and charge the capacitor 1028 before reaching the node 1036. When the voltage Vcc falls below the voltage across the fifth capacitor 1028, the fifth capacitor 1028 will be discharged to power the lighting system 1000 with a valley voltage through the forward-biased third diode 1034.

Since the bus capacitor (i.e., the fifth capacitor 1028) is charged at the signal frequency and powers the system only when the valley voltage is on, good power factor is attained.

Please note that, in the ninth embodiment of the present invention, the third capacitor 1024 is used for terminating the lamp 1050 to the voltage Vcc to achieve dc isolation for the lamp 1050, however, this embodiment merely serves as an example for illustrating the present invention, and should not be taken as a limitation to the scope of the present invention, the first end of the third capacitor 1024 can be coupled to the second node 1038, for terminating the lamp 1050 to the voltage Gnd to achieve dc isolation for the lamp 1050. Likewise, the fourth capacitor 1026 can have its two ends coupled to the fourth node 1042 and the third node 1040.

Figure 11:
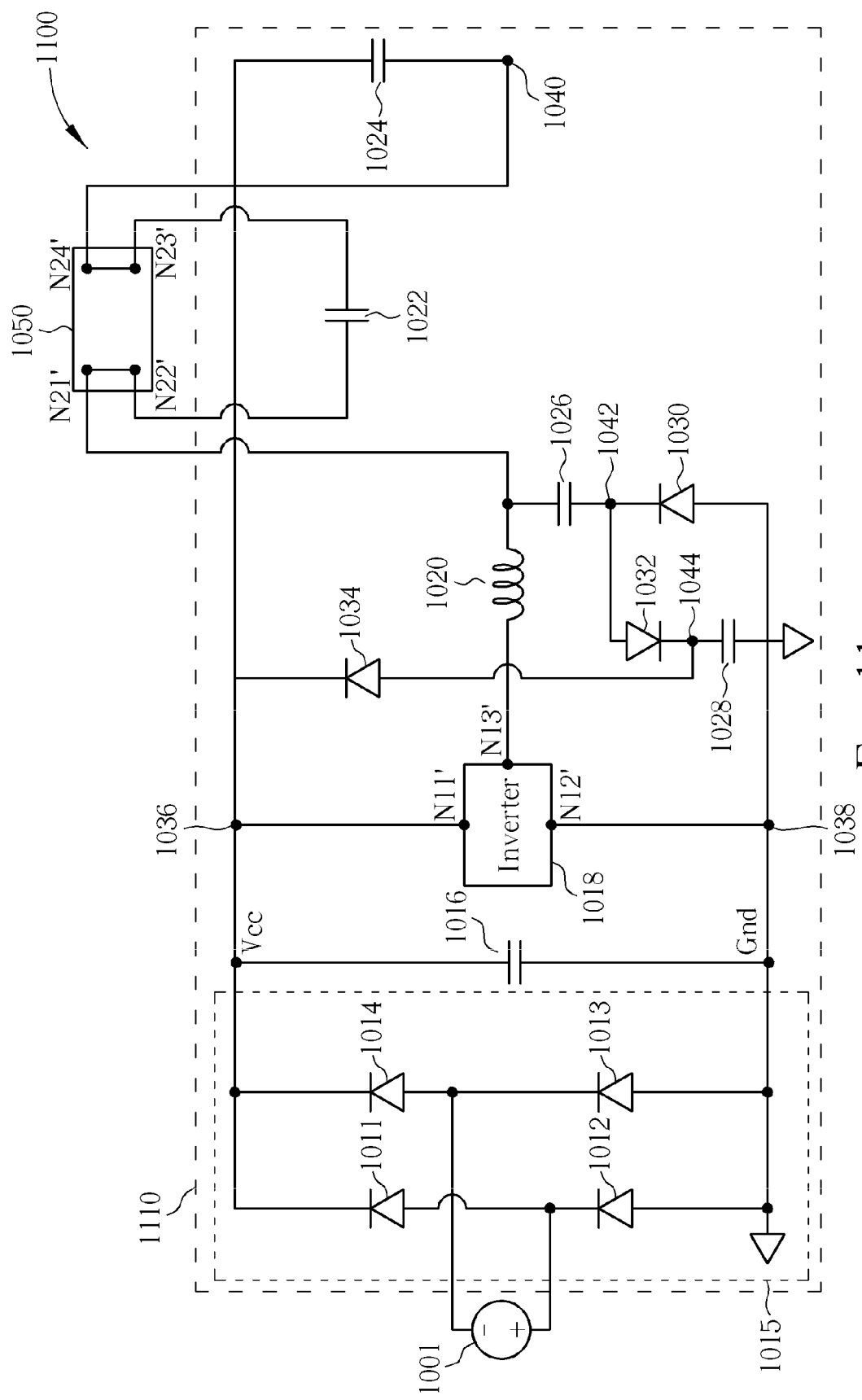
FIG. 11 is a circuit diagram schematically showing an electronic ballast in accordance with a tenth embodiment of the present invention.

Please refer to FIG. 11, which is a circuit diagram schematically showing an electronic ballast in accordance with a tenth embodiment of the present invention. As shown in FIG. 11, the lighting system 1100 includes, but is not limited to, the ac input source 1001, the lamp 1050 and an electronic ballast 1110. The electronic ballast 1110 is similar to the electronic ballast 1010 shown in FIG. 10, and the major difference there between is that the cathode of the first diode 1030 is coupled to the fourth node 1042, the anode of the first diode 1030 is coupled to the second node 1038, the cathode of the second diode 1032 is coupled to the fifth node 1044, the anode of the second diode 1032 is coupled to the fourth node 1042, the cathode of the third diode 1034 is coupled to the first node 1036, the anode of the third diode 1034 is coupled to the fifth node 1044, and the fifth capacitor 1028 has two ends coupled to the second node 1038 (the ground node) and fifth node 1044, respectively. As those skilled in this art can easily understand the operations of the electronic ballast 1110 after reading the disclosure of the ninth embodiment, further details are omitted here for brevity.

Please note that, in the tenth embodiment of the present invention, the third capacitor 1024 is used for terminating the lamp 1050 to the voltage Vcc to achieve dc isolation for the lamp 1050, however, this embodiment merely serves as an example for illustrating the present invention, and should not be taken as a limitation to the scope of the present invention, the first end of the third capacitor 1024 can be coupled to the second node 1038, for terminating the lamp 1050 to the voltage Gnd to achieve dc isolation for the lamp 1050. Likewise, the fourth capacitor 1026 can have its two ends coupled to the fourth node 1042 and the third node 1040.

Figure 12:
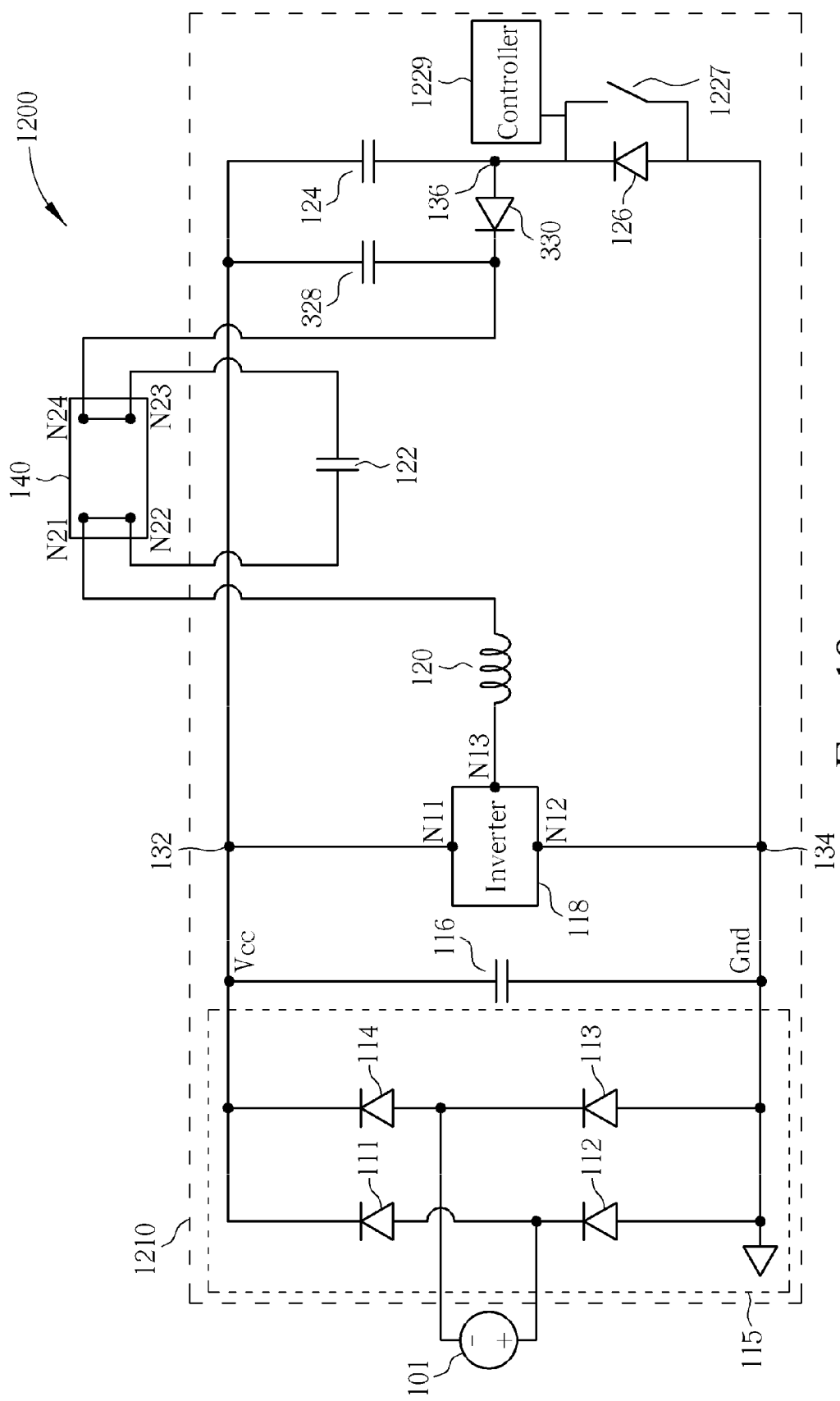
FIG. 12 is a circuit diagram schematically showing an electronic ballast in accordance with a eleventh embodiment of the present invention.

Please refer to FIG. 12, which is a circuit diagram schematically showing an electronic ballast in accordance with an eleventh embodiment of the present invention. As shown in FIG. 12, the lighting system 1200 includes, but is not limited to, the ac input source 101, the lamp 140 and an electronic ballast 1210. The electronic ballast 1210 is similar to the electronic ballast 310 shown in FIG. 3, and the major difference there between is a first switch 1227 included in the electronic ballast 1210 to be connected across the first diode 126 and a controller 1229 included in the electronic ballast 1210 coupled to the first switch 1227. The first switch 1227 has a first end coupled to the third node 136 and a second end coupled to the second node 134. The first switch 1227 can be controlled by the controller 1229 that decodes the predefined power interruption pattern of the mains voltage. When the first switch 1227 is open, the ballast 1210 becomes identical to the ballast 310 with power factor correction. When the first switch 1227 is closed, the third capacitor 124 receives charges at twice the mains frequency to keep the inverter 118 operating at peak mains voltage, losing power factor correction but attains higher output power. In fact the first switch 1227 and the first diode 126 can be merged into a single MOSFET to facilitate the electronic control.

The first switch 1227 can also be connected between the third node 136 and the second node 134 shown in FIG. 4, FIG. 5, and between the fifth node 1044 and the second node 1038 and/or between the third node 1042 and the second node 1038 shown in FIG. 10, respectively. That is, various modifications of implementation of the first switch 1227 may be made without departing from the spirit of the present invention, which also belongs to the scope of the present invention.

Figure 13:
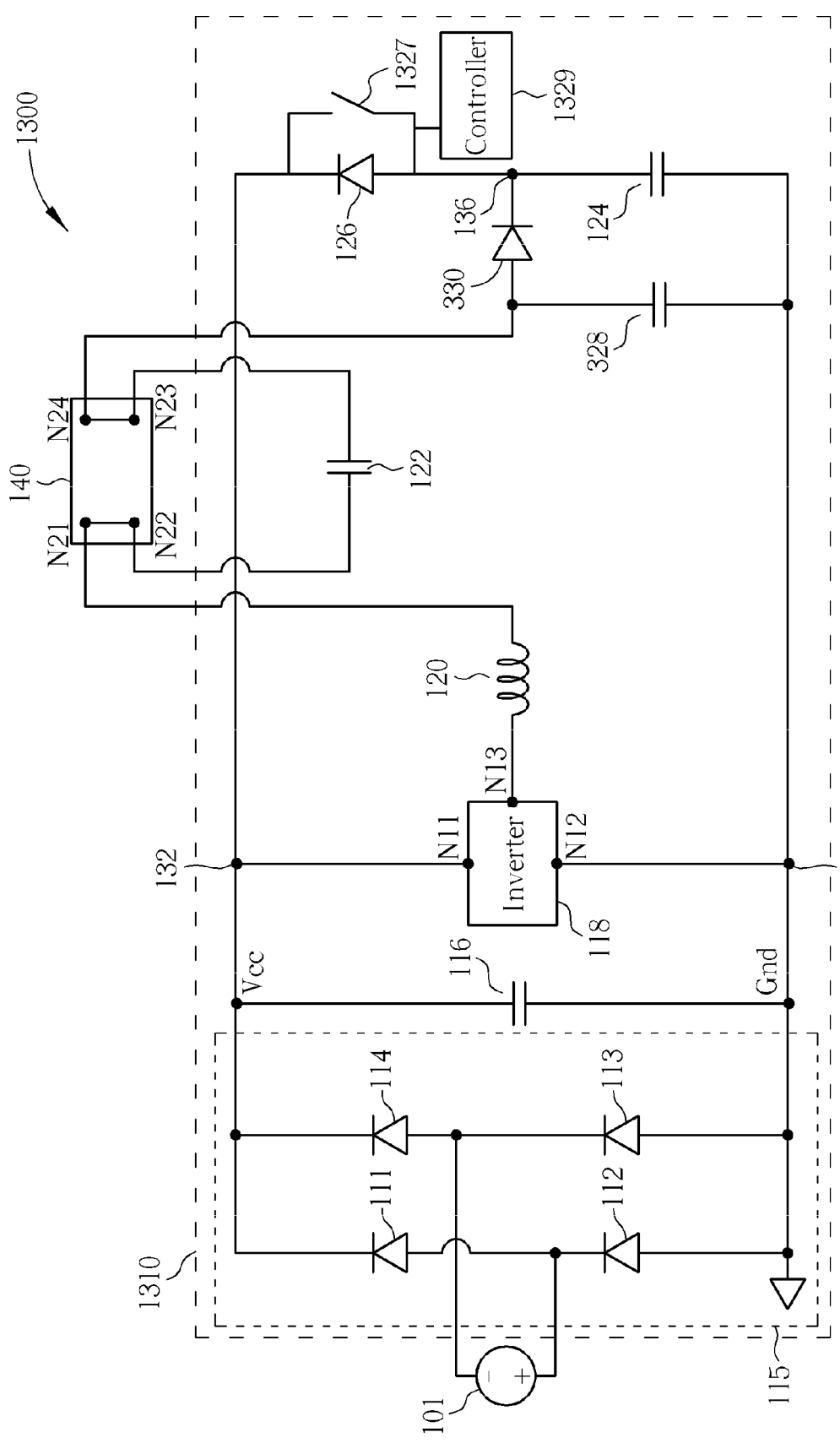
FIG. 13 is a circuit diagram schematically showing an electronic ballast in accordance with a twelfth embodiment of the present invention.

Please refer to FIG. 13, which is a circuit diagram schematically showing an electronic ballast in accordance with an twelfth embodiment of the present invention. As shown in FIG. 13, the lighting system 1300 includes, but is not limited to, the ac input source 101, the lamp 140 and an electronic ballast 1310. The electronic ballast 1310 is similar to the electronic ballast 710 shown in FIG. 7, and the major difference there between is a first switch 1327 included in the electronic ballast 1310 to be connected across the first diode 126 and a controller 1329 included in the electronic ballast 1310 coupled to the first switch 1327. The first switch 1327 has a first end coupled to the third node 136 and a second end coupled to the first node 132. The first switch 1327 can be controlled by a controller 1329 that decodes the predefined power interruption pattern of the mains voltage. When the first switch 1327 is open, the ballast 1310 becomes identical to the ballast 710 with power factor correction. When the first switch 1327 is closed, the third capacitor 124 receives charges at twice the mains frequency to keep the inverter 118 operating at peak mains voltage losing power factor correction but attains higher output power. In fact, the first switch 1327 and the first diode 126 can be merged into a single PMOS to facilitate the electronic control.

The first switch 1327 can also be connected between the third node 136 and the first node 132 shown in FIG. 8 and FIG. 9, and between the fifth node 1044 and the first node 1036 and/or between the third node 1042 and the first node 1036 shown in FIG. 11, respectively. That is, various modifications of implementation of the first switch 1327 may be made without departing from the spirit of the present invention, which also belongs to the scope of the present invention.

In summary, the exemplary electronic ballasts of the present invention have the regenerative valley filled power factor correction (RVF PFC) capability. By utilizing the third capacitor 124 and the diode 126, the lighting system can be re-powered with the valley voltage. The third capacitor 124 is coupled to the fourth terminal of the lamp 140, thereby achieving lamp dc isolation. And the third capacitor 124 is also used as a low-pass filter when the third capacitor 124 is being charged. Therefore, the cost and size of the electronic ballasts can be reduced to a minimum level, thereby satisfying the requirements of a variety of applications.

The present invention is by no means limited to the embodiments as described above by referring to the accompanying drawings, which may be modified and altered in a variety of different ways without departing from the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic ballast, comprising:
  a rectifier circuit, having a pair of input terminals for receiving an ac (alternating current) input voltage and a pair of output terminals for outputting a dc (direct current) voltage, wherein a first output terminal of the rectifier circuit is coupled to a first node and a second output terminal of the rectifier circuit is coupled to a second node;

a first capacitor, having two ends coupled to the first node and the second node, respectively;
an inverter, having a first terminal, a second terminal and a third terminal, wherein the first terminal of the inverter is coupled to the first node, the second terminal of the inverter is coupled to the second node;
an inductor, having a first end coupled to the third terminal of the inverter and a second end for coupling a first terminal of a lamp;
a second capacitor, having two ends for coupling a second terminal and a third terminal of the lamp, respectively;
a third capacitor, having a second end coupled to a third node, wherein the third node is further for coupling a fourth terminal of the lamp; and
a diode, having a first end coupled to the third node;
wherein when a voltage of the first node falls below a cross voltage of the third capacitor, the diode discharges the third capacitor.

2. The electronic ballast of claim 1, wherein a first end of the third capacitor is coupled to the first node, a second end of the diode is coupled to the second node, the second end of the diode is an anode, the first end of the diode is a cathode, and the second node is a ground node.

3. The electronic ballast of claim 1, wherein a first end of the third capacitor is coupled to the second node, a second end of the diode is coupled to the first node, the first end of the diode is an anode, the second end of the diode is a cathode, and the second node is a ground node.

4. The electronic ballast of claim 1, wherein the third capacitor is a bus capacitor.

5. The electronic ballast of claim 1, wherein the first capacitor is a signal-terminating capacitor.

6. The electronic ballast of claim 1, being disposed in a lighting system having a fluorescent lamp or a high intensity discharge lamp.

7. An electronic ballast, comprising:
a rectifier circuit, having a pair of input terminals for receiving an ac (alternating current) input voltage and a pair of output terminals for outputting a dc (direct current) voltage, wherein a first output terminal of the rectifier circuit is coupled to a first node and a second output terminal of the rectifier circuit is coupled to a second node;
a first capacitor, having two ends coupled to the first node and the second node, respectively;
an inverter, having a first terminal, a second terminal and a third terminal, wherein the first terminal of the inverter is coupled to the first node, the second terminal of the inverter is coupled to the second node;
a first inductor, having a first end coupled to the third terminal of the inverter and a second end for coupling a first terminal of a lamp;
a second capacitor, having two ends for coupling a second terminal and a third terminal of the lamp, respectively;
a third capacitor, having a second end coupled to a third node;
a first diode, having a first end coupled to the third node;
a fourth capacitor, having a second end coupled to the fourth terminal of the lamp; and
a second diode, having two ends coupled to the second end of the fourth capacitor and the third node, respectively.

8. The electronic ballast of claim 7, wherein a first end of the fourth capacitor is coupled to the first node, and the second node is a ground node.

9. The electronic ballast of claim 7, wherein a first end of the fourth capacitor is coupled to the second node, and the second node is a ground node.

10. The electronic ballast of claim 7, wherein a first end of the third capacitor is coupled to the first node, a second end of the first diode is coupled to the second node, the second end of the first diode is an anode, the first end of the first diode is a cathode, an anode of the second diode is coupled to the third node, a cathode of the second diode is coupled to the second end of the fourth capacitor, and the second node is a ground node.

11. The electronic ballast of claim 10, further comprising:
a first switch, having two ends coupled to the third node and the second node.

12. The electronic ballast of claim 11, wherein the first switch and the first diode are replaced by an NMOS.

13. The electronic ballast of claim 7, wherein the first end of the third capacitor is coupled to the second node, the second end of the first diode is coupled to the first node, the first end of the first diode is an anode, the second end of the first diode is a cathode, the anode of the second diode is coupled to the second end of the fourth capacitor, the cathode of the second diode is coupled to the third node, and the second node is a ground node.

14. The electronic ballast of claim 13, further comprising:
a first switch, having two ends coupled to the third node and the first node.

15. The electronic ballast of claim 14, wherein the first switch and the first diode are replaced by an PMOS.

16. The electronic ballast of claim 7, wherein the third capacitor is a bus capacitor.

17. The electronic ballast of claim 7, wherein the first capacitor is a signal-terminating capacitor.

18. The electronic ballast of claim 7, further comprising:
a second inductor, having two ends coupled to the second end of the fourth capacitor and the third terminal of the inverter, respectively.

19. The electronic ballast of claim 7, further comprising:
a second inductor, having two ends coupled to the second end of the first inductor and the second end of the fourth capacitor, respectively.

20. The electronic ballast of claim 7, being disposed in a lighting system having a fluorescent lamp or a high intensity discharge lamp.

21. An electronic ballast, comprising:
a rectifier circuit, having a pair of input terminals for receiving an ac (alternating current) input voltage and a pair of output terminals for outputting a dc (direct current) voltage, wherein a first output terminal of the rectifier circuit is coupled to a first node and a second output terminal of the rectifier circuit is coupled to a second node;
a first capacitor, having two ends coupled to the first node and the second node, respectively;
an inverter, having a first terminal, a second terminal and a third terminal, wherein the first terminal of the inverter is coupled to the first node, the second terminal of the inverter is coupled to the second node;
an inductor, having a first end coupled to the third terminal of the inverter and a second end for coupling a first terminal of a lamp;
a second capacitor, having two ends for coupling a second terminal and a third terminal of the lamp, respectively;
a third capacitor, having a second end coupled to a third node, wherein the third node is further for coupling a fourth terminal of the lamp;
a fourth capacitor, having a second end coupled to a fourth node;
a fifth capacitor, having a second end coupled to a fifth node;

a first diode, having a second end coupled to the fourth node;

a second diode, having two ends coupled to the fourth node and the fifth node, respectively; and a third diode, having a first end coupled to the fifth node.

22. The electronic ballast of claim 21, wherein a first end of the fourth capacitor is coupled to a second end of the first inductor.

23. The electronic ballast of claim 21, wherein a first end of the fourth capacitor is coupled to the third node.

24. The electronic ballast of claim 21, wherein a first end of the third capacitor is coupled to the first node, and the second node is a ground node.

25. The electronic ballast of claim 21, wherein the first end of the third capacitor is coupled to the second node, and the second node is a ground node.

26. The electronic ballast of claim 21, wherein a first end of the fifth capacitor is coupled to the first node, a first end of the first diode is coupled to the first node, a second end of the third diode is coupled to the second node, the first end of the first diode is a cathode, the second end of the first diode is an anode, an anode of the second diode is coupled to the fifth node, a cathode of the second diode is coupled to the fourth node, the second end of the third diode is an anode, the first end of the third diode is a cathode, and the second node is a ground node.

27. The electronic ballast of claim 26, further comprising:
a first switch, having two ends coupled to the fifth node and the second node.

28. The electronic ballast of claim 27, wherein the first switch and the third diode are replaced by an NMOS.

29. The electronic ballast of claim 26, further comprising:
a first switch, having two ends coupled to the fourth node and the second node.

30. The electronic ballast of claim 29, wherein the first switch is an NMOS.

31. The electronic ballast of claim 21, wherein the first end of the fifth capacitor is coupled to the second node, the first end of the first diode is coupled to the second node, the first end of the third diode is coupled to the first node, the first end of the first diode is an anode, the second end of the first diode is a cathode, the anode of the second diode is coupled to the fourth node, the cathode of the second diode is coupled to the fifth node, the first end of the third diode is a cathode, the second end of the third diode is an anode, and the second node is a ground node.

32. The electronic ballast of claim 31, further comprising:
a first switch, having two ends coupled to the fifth node and the first node.

33. The electronic ballast of claim 32, wherein the first switch and the third diode are replaced by a PMOS.

34. The electronic ballast of claim 31, further comprising:
a first switch, having two ends coupled to the fourth node and the first node.

35. The electronic ballast of claim 34, wherein the first switch is a PMOS.

36. The electronic ballast of claim 21, wherein the fifth capacitor is a bus capacitor.

37. The electronic ballast of claim 21, wherein the first capacitor is a signal-terminating capacitor.

38. The electronic ballast of claim 21, being disposed in a lighting system having a fluorescent lamp or a high intensity discharge lamp.

* * * * *